Nov. 19, 1929.  W. KREUZER  1,736,348
FRUIT PICKER
Filed June 8, 1926
Fig. 1.
Fig. 2.
Fig. 3.
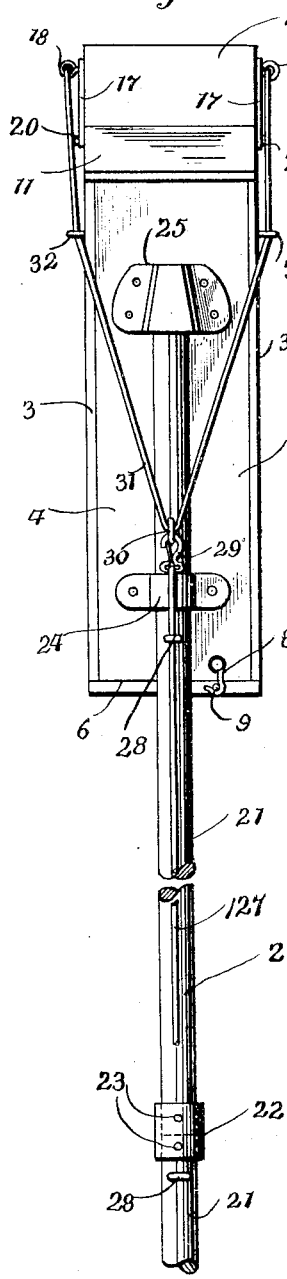
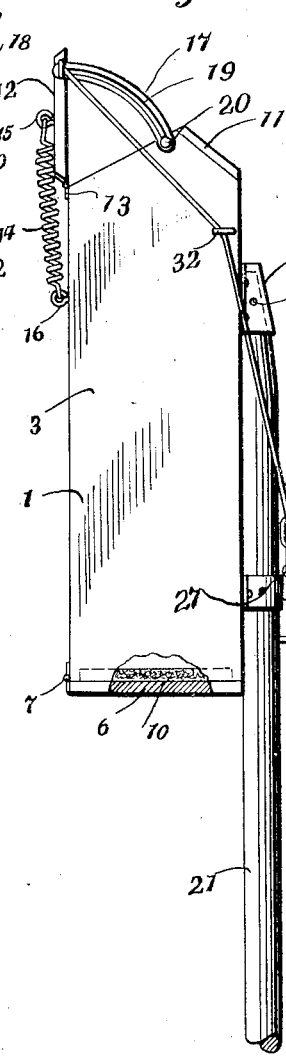
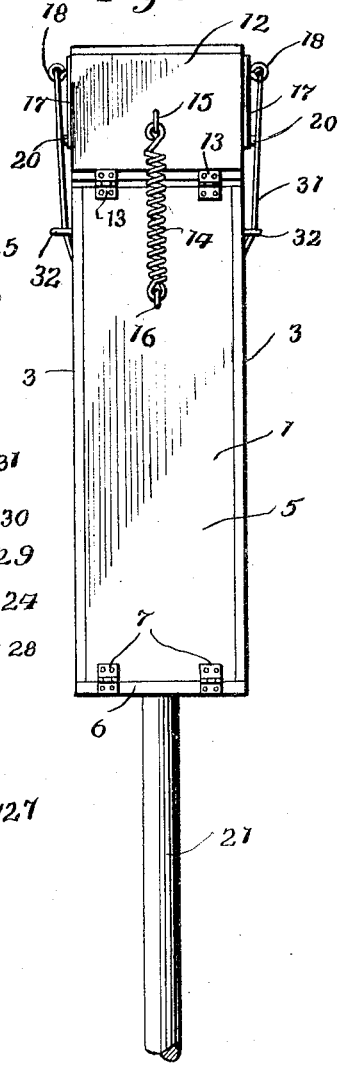
Inventor
Walter Kreuzer
By Lacey & Lacey, Attorneys Patented Nov. 19, 1929

1,736,348

UNITED STATES PATENT OFFICE

WALTER KREUZER, OF EDWARDSVILLE, ILLINOIS

FRUIT PICKER

Application filed June 8, 1926. Serial No. 114,499.

This invention relates to fruit pickers and more particularly to a picker employed to harvest apples and other similar fruit.

One object of the invention is to provide a picker by means of which apples and the like may be readily removed from a tree by a person standing upon the ground.

Another object of the invention is to permit the fruit to be readily detached from the tree when disposed in position to drop into a receptacle forming a part of the picker.

A further object of the invention is to prevent the fruit from being bruised when it drops into the receptacle and to also prevent it from being bruised by the picker while being detached from the tree.

Another object of the invention is to provide the receptacle with a cover or closure door for its upper end which will be yieldably held open so that the fruit may be received in the upper end of the receptacle and the door then moved towards a closed position in order to prevent withdrawal of the fruit and cause it to be detached from the tree when the receptacle is moved downwardly.

Another object of the invention is to provide the picker with improved means for moving the door to a closed position and to so mount the receptacle upon a reach pole that it will be prevented from turning about the pole but permitted to be readily detached therefrom when not in use.

This invention is illustrated in the accompanying drawing, wherein

Figure 1 is a view showing the improved picker in front elevation;

Fig. 2 is a view in side elevation with the lower portion of the receptacle broken away;

Fig. 3 is a rear elevation of the picker.

The picker forming the subject-matter of this invention includes a receptacle 1 into which the fruit is to be received and a reach pole 2, by means of which it may be held in an elevated position by a person standing upon the ground beneath a tree. The receptacle is vertically elongated so that a number of apples or other fruit to be picked may be received therein and includes a body portion having side walls 3 and front and rear walls 4 and 5. The lower end of the body is normally closed by a closure door or bottom 6 which is hingedly mounted by hinges 7 secured to the rear wall 5 and an adjacent edge face of the bottom and releasably held closed by a hook or other suitable fastener 8 connected with the front wall for movement into and out of latching engagement with a pin or other keeper 9 projecting from the front edge of the door. The inner face of the door is padded, as shown at 10 in Fig. 2, to prevent fruit from being bruised when it drops into the receptacle and if desired the walls of the receptacle may also be padded. By having the bottom hingedly mounted and releasably secured the fruit may be conveniently removed. The upper end portions of the side walls 3 are tapered, as shown in Fig. 2, and carry a head or upper wall 11 which is permanently secured thereto. The forward portion of the receptacle will, therefore, be closed at its upper end by a permanent head but its rear portion will be open to provide a passage through which the fruit may pass into the receptacle. The door 12 by means of which the open upper end of the receptacle may be closed is hingedly mounted by hinges 13 secured to the upper end of the rear wall 5 and adjacent edge of the closure, and this door or closure is normally held open by a spring 14 having its upper and lower ends engaged with eyes 15 and 16 carried by the door and rear wall of the receptacle. In order to guide movement of the door and prevent it from being swung open beyond a vertical position, there has been provided arcuate strips 17 which are loosely connected with opposite sides of the closure by eyes 18 and formed with longitudinally extending slots 19 through which pass pins 20 carried by the side walls of the receptacle. By having the strips 17 pivotally connected with the door and slidably engaged with the pins 20 it may be freely moved into and out of a closed position but it can not be drawn rearwardly by the spring beyond the vertical position. The housing and its upper and lower doors are preferably formed of wood but it will be understood that metal or any other suitable material may be employed.

The reach pole 2 by means of which the receptacle is held in position to pick the fruit from a tree may consist of one length of material but will preferably consist of cooperating sections 21, the adjacent ends of which are detachably connected by a sleeve coupling 22 through which removable pins 23 are passed. It will be understood that any number of sections may be provided and that other specific types of couplings may be substituted for the one illustrated. The upper section of the reach pole is passed through a guide 24 secured to the front wall of the receptacle adjacent its lower end and the upper end of the pole is fitted into a socket 25. The socket, which is open at its lower end, is rectangular in cross section and preferably tapers upwardly so that the tapered upper end of the reach pole may have wedging fit in the socket. Since the socket and the portion of the reach pole which is fitted therein are rectanguar in cross section the receptacle will be prevented from swinging about the pole and, therefore, it cannot readily move out of proper relation to fruit being picked. If desired, removable pins 26 and 27 may be passed through the socket and guide in order to prevent the receptacle from accidentally becoming detached from the pole.

The pull line 127, which may be flexible wire or strong twine, extends through eyes 28 carried by the reach pole and at its upper end carries a snap hook 29 which is engaged with a ring 30 carried by a bridle line 31. The bridle line is also preferably formed of flexible wire, although strong twine may be employed, and has its end portions extending upwardly in diverging relation from the ring 30 and passed through eyes 32, carried by the side walls of the receptacle, and then attached to the eyes 18. It will thus be seen that, when the pull line is drawn downwardly by the operator of the picker, the closure door for the open upper end of the receptacle will be swung downwardly to a closed position against the action of the spring 14.

When this picker is in use, the operator elevates the receptacle through the medium of the reach pole and moves the receptacle into position to dispose an apple to be picked within the open upper end thereof. The line 127 is then drawn upon to swing the door 12 towards a closed position and this will cause either the body of the apple to be gripped between the door and the inner edge of the head 11 or, if the apple has passed into the receptacle a sufficient extent, its stem will be gripped between the door and the head. After the apple or its stem has been engaged between the head and door, it is merely necessary to move the picker downwardly and the apple or its stem may be readily broken loose. It will, of course, be understood that it is not necessary to firmly grip the stem and, therefore, when the picker is moved downwardly, the stem may move outwardly until the apple engages the inner faces of the head and closure and is broken loose from the stem by further downward movement of the picker. After the apple has been broken loose, it drops into the receptacle and either falls upon the pad 10 which will prevent it from being bruised by striking the bottom door 6 or falls upon other fruit in the receptacle. After the receptacle has been filled, it is lowered and the lower door opened so that the fruit may pass outwardly and drop into a suitable receptacle. When the picker is not in use, the reach pole may be detached from the receptacle and its sections taken apart. The receptacle and pole may then be conveniently stored. It will, of course, be obvious that the picker may be put away with the receptacle attached to the reach pole if so desired. It will also be obvious that the operator may stand upon a ladder or other support and use the picker with only one section of the reach pole and that instead of emptying it by releasing the lower door 6 he may tilt the picker over a receptacle with the upper door closed and then allow this door to open and the fruit to pass out through the upper end of the receptacle.

Having thus described the invention, I claim:

A fruit picker comprising a receptacle open at its upper end and having front, rear and side walls, the upper ends of the side walls being tapered, a head wall secured upon the front portions of the tapered ends of the side walls and partly closing the top of the receptacle, a door hinged to the upper edge of the rear wall of the receptacle and resting upon the rear portions of the tapered upper ends of the side walls to abut the upper edge of said head wall when closed, a retractile spring secured at one end to the outer face of said door and at its opposite end to the rear wall to yieldably retain the door open, pins projecting from the side walls adjacent the upper ends of the same, strips attached to the opposite side edges of said door and extending therefrom to the side walls and formed with arcuate slots concentric with the hinges of the door and receiving said pins, and a pull line connected with said door and passing downwardly therefrom over the front of the receptacle whereby the door may be closed.

In testimony whereof I affix my signature.

WALTER KREUZER. [L. S.]